United States Patent

Weber et al.

Patent Number: 5,482,089
Date of Patent: Jan. 9, 1996

[54] FLEXIBLE CONDUIT FOR THE EXHAUST LINE FOR AN INTERNAL COMBUSTION ENGINE

[75] Inventors: Otto Weber, Wolfsburg; Siegfried Grohnert, Cremlingen; Rolf Kirsch, Braunschweig, all of Germany

[73] Assignee: Volkswagen AG, Wolfsburg, Germany

[21] Appl. No.: 346,351

[22] Filed: Nov. 29, 1994

Related U.S. Application Data

[63] Continuation of Ser. No. 152,571, Nov. 15, 1993, abandoned.

[30] Foreign Application Priority Data

Dec. 18, 1992 [DE] Germany .......................... 42 42 950.1

[51] Int. Cl.⁶ ..................................................... F16L 11/00
[52] U.S. Cl. .......................... 138/122; 138/121; 138/109; 138/103
[58] Field of Search .................................... 138/122, 121, 138/109, 172, 103, 139, 173, DIG. 8, 144

[56] References Cited

U.S. PATENT DOCUMENTS

| | | | |
|---|---|---|---|
| 1,295,630 | 2/1919 | Sundh | 138/122 |
| 2,563,578 | 8/1951 | Candee . | |
| 2,707,492 | 5/1955 | Harris et al. | 138/122 |
| 2,986,169 | 5/1961 | McCormick | 138/173 |
| 3,362,434 | 1/1968 | Medford et al. | 138/122 |
| 3,743,328 | 7/1973 | Longfellow | 138/122 X |
| 4,130,904 | 12/1978 | Whalen | 138/122 |
| 4,196,031 | 4/1980 | Lalikos et al. | 138/122 X |
| 4,236,509 | 12/1980 | Takahashi et al. | 138/122 |
| 4,327,775 | 5/1982 | Tally | 138/122 |
| 4,342,612 | 8/1982 | Lalikos et al. | 138/122 X |
| 4,456,034 | 6/1984 | Bixby | 138/122 |
| 4,463,779 | 8/1984 | Wink et al. | 138/125 |
| 4,674,543 | 6/1987 | Ziemek et al. | 138/122 |
| 4,854,416 | 8/1989 | Lalikos et al. | 138/121 X |
| 4,867,269 | 9/1989 | Lalikos et al. | 138/121 X |
| 4,966,202 | 10/1990 | Bryan et al. | 138/122 |
| 4,966,741 | 10/1990 | Rush et al. | 138/122 |

FOREIGN PATENT DOCUMENTS

| | | | |
|---|---|---|---|
| 11895 | of 1902 | United Kingdom | 138/122 |
| 21531 | of 1907 | United Kingdom | 138/122 |
| 349965 | 5/1931 | United Kingdom | 138/122 |
| 588858 | 6/1947 | United Kingdom | 138/122 |
| 760640 | 11/1956 | United Kingdom . | |
| 2057779 | 4/1981 | United Kingdom . | |

*Primary Examiner*—David Scherbel
*Assistant Examiner*—Patrick F. Brinson
*Attorney, Agent, or Firm*—Brumbaugh, Graves, Donohue & Raymond

[57] ABSTRACT

A flexible conduit for the exhaust line of an internal combustion engine includes a flexurally supple tube having several helical corrugations of equal pitch and a flexible supporting coil spring having its ends fixedly connected to flanges at opposite ends of the tube and which is frictionally received in the trough of one of the helical corrugations.

4 Claims, 1 Drawing Sheet

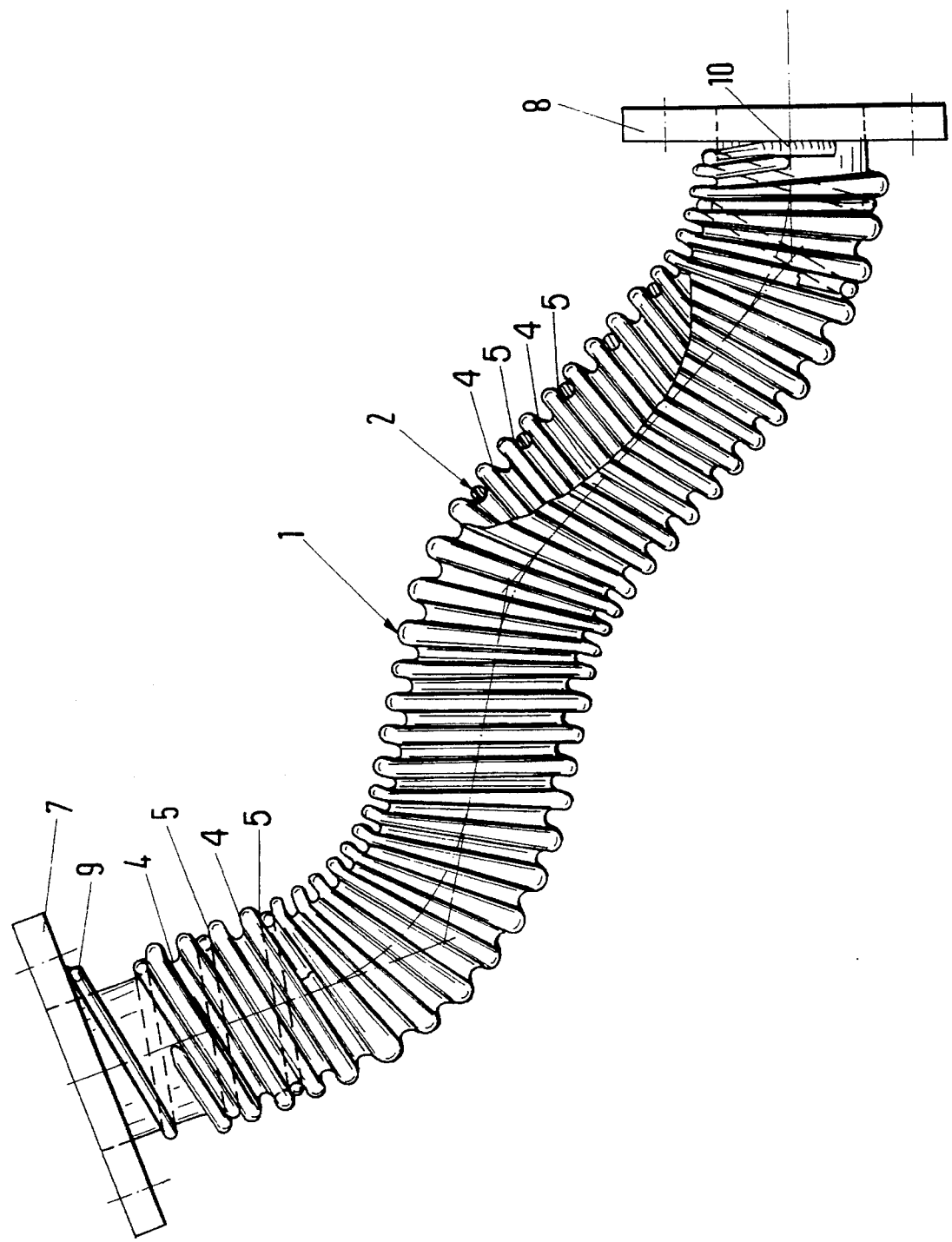

FLEXIBLE CONDUIT FOR THE EXHAUST LINE FOR AN INTERNAL COMBUSTION ENGINE

This application is a continuation of application Ser. No. 08/152,571, filed on Nov. 15, 1993, now abandoned.

BACKGROUND OF THE INVENTION

This invention relates to flexible conduits for exhaust lines for internal combustion engines.

German Offenlegungsschrift No. 22 56 718 discloses an exhaust line segment for a motor vehicle internal combustion engine consisting of an ordinary corrugated tube having circular corrugations, each of which is located in a cross-sectional plane of the tube. This exhaust line segment serves as a disconnecting element between the engine and the remainder of the exhaust system which is supported from the bottom of the vehicle by elastic supports, as also disclosed in German Offenlegungsschrift No. 38 80 489. A flexible connecting element of this type absorbs relative movements between the engine, especially a transversely-installed engine, and the other parts of the exhaust system. For this purpose, it is important that the flexible connecting element transmits practically none of the vibrations generated by the engine into the other parts of the exhaust system and thus into the vehicle itself.

SUMMARY OF THE INVENTION

Accordingly, it is an object of the present invention to provide a flexible conduit for the exhaust line for an internal combustion engine which overcomes the disadvantages of the prior art.

Another object of the invention is to provide such a flexible conduit which will assure dependable tightness in conveying exhaust gases, while having the requisite flexibility over a long service life, and also assuring minimal transmission of engine vibration.

These and other objects are attained by providing a flexible corrugated conduit having end portions with helical corrugations and at least one helical coil support spring frictionally engaging the helical corrugations at at least one end of the conduit to connect the conduit to an adjacent exhaust line component.

Thus a flexible conduit according to the invention includes two parts, i.e., a tube made extremely supple by suitable corrugation and choice of material and/or wall thickness, to convey the exhaust gases, and a supporting coil spring frictionally retained in a helical corrugation of the tube. The coil spring provides rigidity and diminishes the intensity of any vibration imparted to the conduit. The frictional engagement facilitates relative movement between the spring and the tube.

Preferably, the natural frequency of the flexible conduit is greater than the natural frequency of the engine mounting and less than the frequency of vibration produced by operation of the engine. Based on the vibrational characteristics of conventional motor vehicle engines, a natural frequency on the order of 15 Hz. is appropriate for the conduit of the invention.

BRIEF DESCRIPTION OF THE DRAWING

Further objects and advantages of the invention will be apparent from a reading of the following description in conjunction with the accompanying drawing, which is a partial sectional view illustrating a representative embodiment of a flexible conduit arranged according to the invention for the exhaust system of a motor vehicle engine.

DESCRIPTION OF PREFERRED EMBODIMENT

In the typical embodiment of the invention shown in the drawing, a flexible conduit consists of two main parts, i.e., a corrugated tube 1 and a helical supporting coil 2 made of spring wire. In this example, the corrugated tube 1, which is extremely supple in flexure, has corrugations formed like a screw thread with two adjacent helical troughs 4 and 5, .i.e., helical grooves of equal pitch, terminating at one end in a flange 7 for attachment to the exhaust elbow of an internal combustion engine and at the other end in a flange 8 for attachment to another segment of the exhaust line. Only one of the two helical troughs 4 and 5, i.e., the trough 5 in the illustrated example, receives the supporting coil 2, which has its opposite ends 9 and 10 affixed to the flanges 7 and 8, respectively. This supporting coil 12 imparts to the flexible conduit the requisite inherent rigidity and restoring force in response to bending. If vibrations are introduced into the conduit, the frictional engagement permits relative movement between the corrugated tube 1 and the supporting coil 2, which in dynamic operation provide a resonance-suppressing frictional damping. On the other hand, in the quasi-static range, when relatively high-amplitude motion of the engine is imparted to the exhaust line, the conduit according to the invention has great flexibility.

The invention thus provides a flexible conduit for an exhaust line that satisfies all of the requirements for a disconnect element in a simple and reliable construction.

Although the invention has been described herein with reference to a specific embodiment, many modifications and variations therein will readily occur to those skilled in the art. Accordingly, all such variations and modifications are included within the intended scope of the invention.

We claim:

1. A flexible conduit for an exhaust line of an internal combustion engine comprising a corrugated tube having a plurality of adjacent helical corrugations of like pitch forming a multiple thread providing separate adjacent troughs and only one helical spring-wire supporting coil which is frictionally received in the trough of only one of the plurality of adjacent helical corrugations and which has at least one end portion fixedly connected to the corrugated tube.

2. A flexible conduit according to claim 1 including a flange at each end of the corrugated tube to which the end portions of the supporting coil are fixedly connected.

3. A flexible conduit according to claim 1 wherein the corrugated tube is supple in bending motion, but is supported with respect to such motion by frictional contact with the supporting coil.

4. A flexible conduit according to claim 1 wherein the conduit has a natural frequency which is dependent upon the spring wire supporting coil arrangement and wherein each of the conduit and a mount for the engine has a natural frequency and the natural frequency of the conduit is controlled to be greater than the natural frequency of an engine mount with which it is associated and less than the frequency of vibration produced by operation of the associated engine.

* * * * *